(No Model.) 2 Sheets—Sheet 1.
T. BELL.
MACHINE FOR SEPARATING DECORTICATED COTTON SEED.
No. 582,516. Patented May 11, 1897.
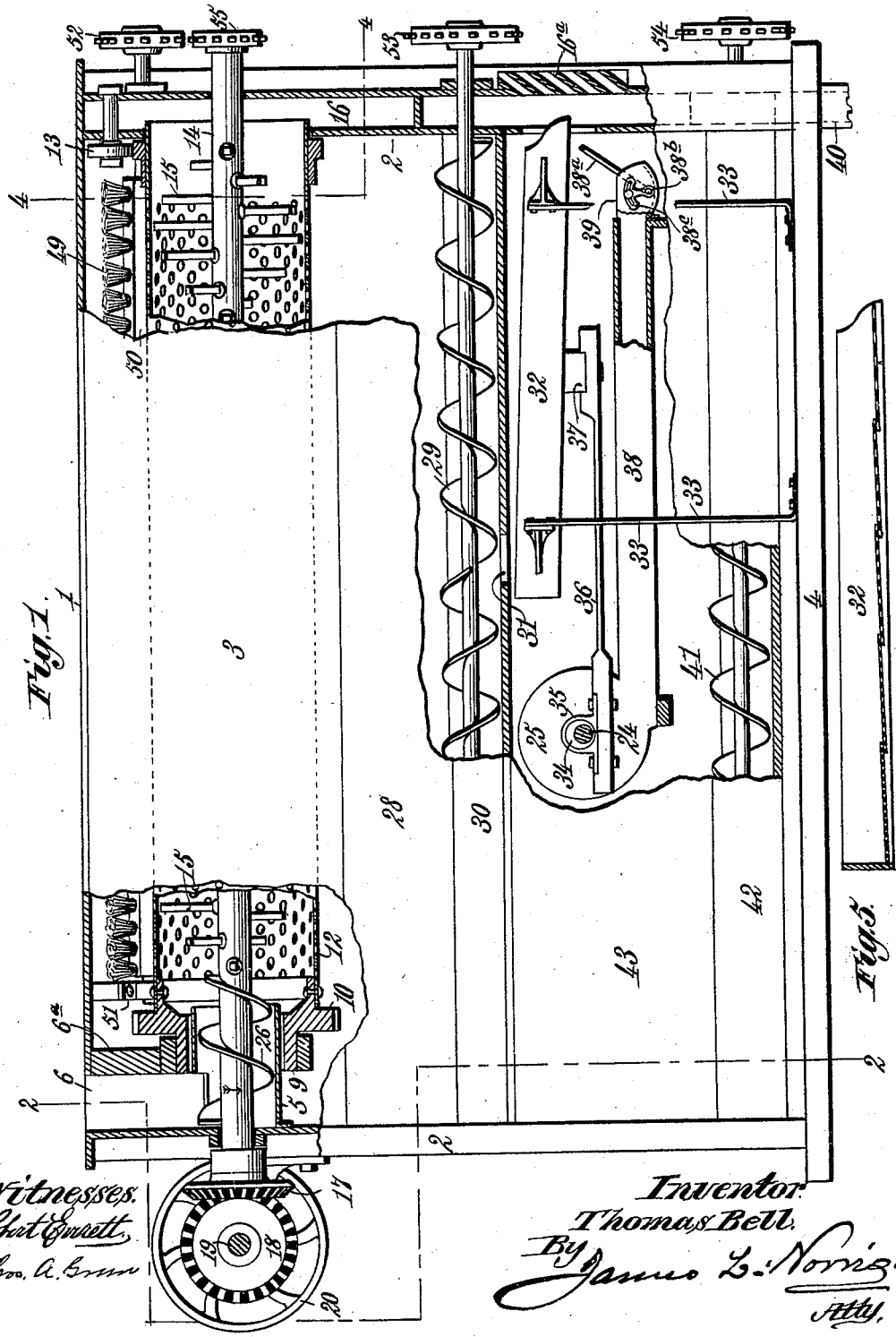

(No Model.) 2 Sheets—Sheet 2.
T. BELL.
MACHINE FOR SEPARATING DECORTICATED COTTON SEED.
No. 582,516. Patented May 11, 1897.
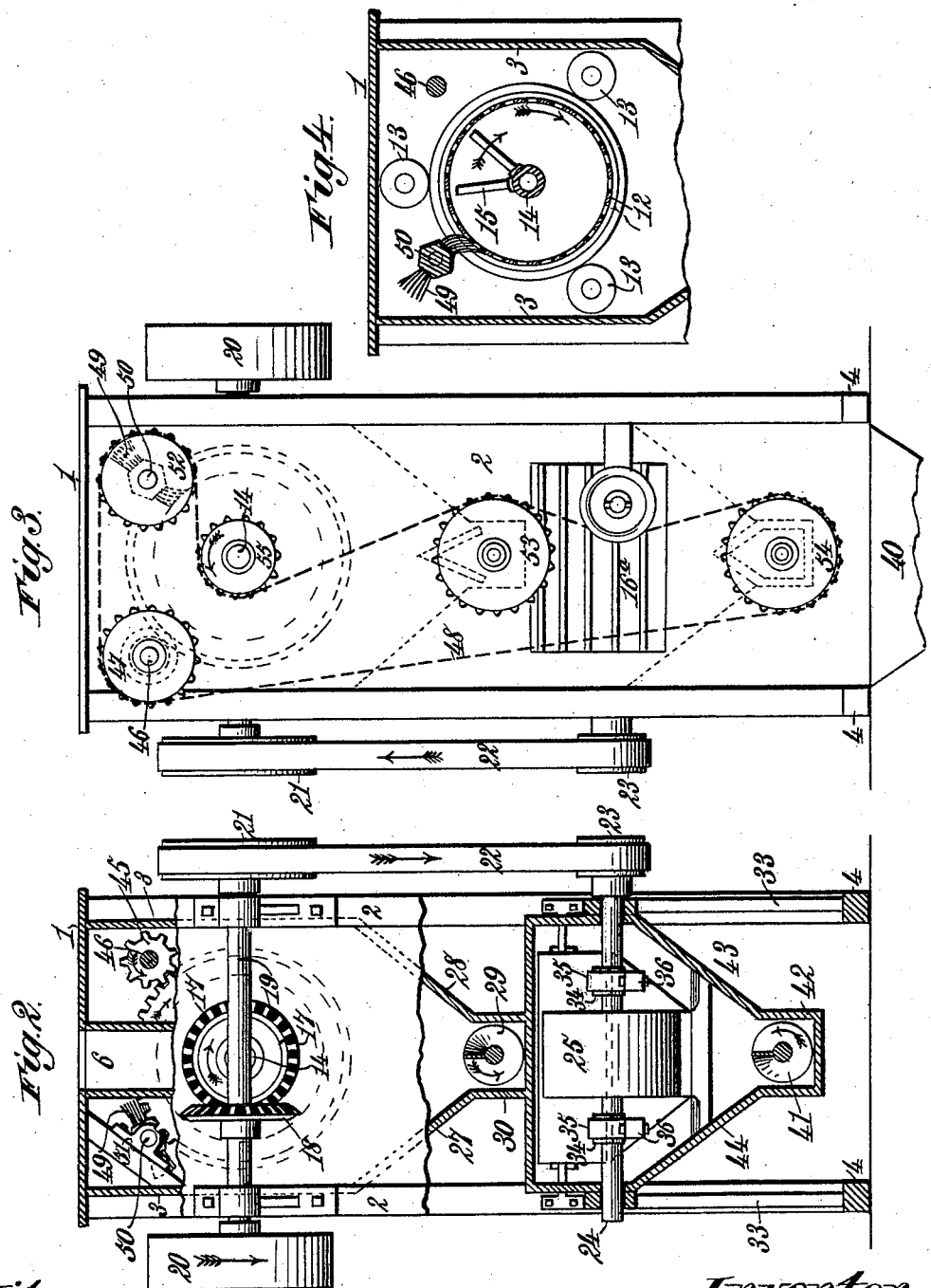
Witnesses.
Inventor.
Thomas Bell.
By James L. Norris.
Atty.

UNITED STATES PATENT OFFICE.

THOMAS BELL, OF DALLAS, TEXAS.

MACHINE FOR SEPARATING DECORTICATED COTTON-SEED.

SPECIFICATION forming part of Letters Patent No. 582,516, dated May 11, 1897.

Application filed March 28, 1896. Serial No. 585,223. (No model.)

*To all whom it may concern:*

Be it known that I, THOMAS BELL, a citizen of the United States, residing at Dallas, in the county of Dallas and State of Texas, have invented new and useful Improvements in Machines for Separating Decorticated Cotton-Seed, of which the following is a specification.

This invention has for its chief object to increase the capacity of machines for separating decorticated cotton-seed and to provide a new and improved machine which will perfectly separate the meal from the hulls of decorticated cotton-seed, whereby perfectly clean meal is collected, from which a clear, sweet, and superior oil can be obtained.

To accomplish this object, my invention consists in the features of construction and the combination or arrangement of parts hereinafter described and claimed, reference being made to the accompanying drawings, in which—

Figure 1 is a broken sectional side elevation of a separator constructed according to my invention. Fig. 2 is a sectional view taken on the line 2 2, Fig. 1, looking at what may be termed the "front" end of the machine. Fig. 3 is an end elevation looking at what may be termed the "rear" end of the machine. Fig. 4 is a detail sectional view taken on the line 4 4, Fig. 1; and Fig. 5 is a detail longitudinal sectional view of the riddle.

In order to enable those skilled in the art to make and use my invention, I will now describe the same in detail, referring to the drawings, wherein it will be observed that the external casing of the separator is narrow as compared to its height and comprises a top frame or wall 1, end walls or frames 2, vertical side walls or frames 3, and a base-frame 4, all of which parts may be of any construction suitable to meet the conditions required.

The top portion of the casing at one end is provided with a fixed horizontal feed-tube 5, into which the decorticated cotton-seeds are delivered in any suitable manner through a feed chute or opening 6. Over the inner end of the feed-tube 5 and rotatably supported by a hanger 6ª is arranged the hub 9 of a gear-wheel 10, riveted or otherwise attached to the receiving end of a horizontal foraminous cylinder 12. The tail end of this cylinder is located between and supported by three or more roller-bearings 13, constructed and arranged in any suitable manner, so that the cylinder is free to be rotated. A beater-shaft 14 extends longitudinally through the foraminous cylinder and is provided with beater-blades 15, extending in a spiral line around the shaft in such manner that the decorticated cotton-seed delivered to the cylinder from the feed-tube is moved longitudinally along the cylinder from the receiving end toward the tail end thereof, the meal being forced through the perforations, while the hulls are delivered from the tail end of the cylinder into a perpendicular hull-conduit 16, constructed in any suitable manner in the end of the casing in juxtaposition to the tail end of the cylinder.

The beater-shaft is extended through the feed-tube to the exterior of the casing, where its extremity is provided with an attached beveled gear 17, meshing into a bevel-gear 18 on a main drive-shaft 19, to which rotary motion is imparted through the medium of a drive-pulley 20, fixed to one end of said shaft. The other end of the main drive-shaft is provided with a pulley 21, connected by a belt 22 with a pulley 23 on one end of the transverse fan-shaft 24 of an air-blower or air-forcing device 25 of any ordinary or suitable construction.

The end portion of the beater-shaft, which extends through the feed-tube 5, is provided with a worm or spiral flange 26, constituting a force-feed device, by which the stock is forced along the feed-tube 5 into the receiving end of the foraminous cylinder.

The interior of the external casing is constructed with deflector-walls, as at 27 and 28, Fig. 2, for deflecting the meal to the spiral conveyer 29, rotating in the conveyer box or chamber 30, arranged at the lower portions of the deflector-boards. The spiral conveyer is constructed with two reversely-arranged flights, so that the meal is caused to move from opposite end portions of the conveyer to the central portion, where it is delivered through an opening or passage 31 to a shaking or vibrating riddle 32, having meshes or screen-sections which gradually increase in dimensions from the upper or receiving end to the lower or tail end of the riddle, as shown in Fig. 5, the construction being preferably such that the coarser mesh lies at the tail-end portion of the riddle. The double-flight conveyer operating to deliver the meal to the riddle approximately at the center of the structure materially contributes in reducing the size of the machine by enabling a more compact structure to be produced.

The riddle 32 as here shown is mounted on the upper ends of vertical spring-supports 33, attached at their lower ends to the base-frame of the separator or to some support inside the external casing, but the riddle may be otherwise supported, so that it can reciprocate or vibrate.

The fan-shaft 24 of the air-blower or air-forcing device 25 is provided with eccentrics, as at 34, working in suitable straps, as at 35, bolted or otherwise attached to rods or pitmen 36, which connect with the riddle-frame, as at 37, in such manner that the rotary motion of the fan-shaft imparts a vibratory motion to the riddle.

The air-blower or air-forcing device is constructed with a longitudinal air trunk or tube 38, having its delivery-end portion 39 arranged in proper relation to the tail end of the riddle, so that the light material, such as small particles of cotton-seed hulls, that would otherwise go through the larger perforations of the riddle, are raised by the air-blast and forced into the vertical hull-conduit 16, from whence the air can escape between the inclined slats 16$^a$. The air-delivery end of the trunk or tube 38 is provided with an adjustable air-deflecting plate or valve 38$^a$, whereby the direction of the air may be more or less varied with respect to the tail end of the riddle. The plate or valve 38$^a$ is mounted at its lower end on a shaft 38$^b$, having a handle 38$^c$ by which to turn the shaft to vary the inclination of the plate or valve. Any suitable means may be employed to lock the handle after the desired adjustment of the plate or valve is effected.

The accumulation of hulls and other matter in the hull-conduit 16 may be carried off from the lower portion thereof in any suitable manner—as, for instance, by a chute 40 of any desired construction.

It will be obvious that the gentle action of the air-current produced by the air-blower causes the small particles of hulls to rise over the tail end of the riddle into the conduit 16, while the clean meal at the tail end portion of the riddle descends through the meshes and passes around the air trunk or pipe to a spiral conveyer 41, arranged in a conveyer box or chamber 42 at the lower end portions of the deflector-boards 43 and 44, which serve to direct the meal passing through the riddle to the conveyer 41, as will be obvious.

The gear-wheel 10 at the receiving end of the foraminous cylinder 12 meshes into a pinion 45, (best seen in Fig. 2,) which is secured to one end of a longitudinal shaft 46. The other end of this shaft extends outside the casing and is provided with a sprocket-wheel 47, engaging a chain belt 48.

The perforations in the cylinder 12 are prevented from becoming clogged through the medium of a brush composed of bristles 49, secured to a longitudinal shaft 50, having its inner end mounted in a suitable bearing, as at 51, and its outer end provided with a sprocket-wheel 52. The brush-bristles may be composed of hair, wire, or any other material suitable for the purpose of clearing the perforations of the cylinder during the time the cylinder and brush are rotating.

The shafts of the two conveyers are provided, respectively, with sprocket-wheels 53 and 54, and the beater-shaft is also provided with a sprocket-wheel, as at 55. The sprocket-wheels above referred to engage the chain belt 48, and this chain belt is driven by the action of the sprocket-wheel 55 on the end of the beater-shaft 14, which beater-shaft, as before stated, is rotated by bevel-gear connections with the main drive-shaft 19.

It will be observed that the gear-wheel 10 is of comparatively large diameter, and the pinion 45 is of comparatively small diameter, so that the mechanism described serves to slowly rotate the cylinder while the beater-shaft is rapidly rotated. The gearing described and shown is such that the foraminous cylinder and the beater-shaft rotate in the same direction, and during the operation of the machine the stock is carried upwardly by the cylinder, and as the stock approaches the central top portion the attraction of gravitation overcomes the centrifugal force and the stock falls, thereby affording ample opportunity for the beater to properly perform its function of beating the stock and perfectly driving out the meal from the hulls.

In ordinary apparatus for the purpose in hand a hexagonal reel is used, and the stock is carried upward by the reel and the mass forms into a roll which comes down the side of the reel almost in a solid body, which results in slow and inferior separation of the meal or meat from the hulls of the cotton-seed. This objection is avoided by my construction and operation of the foraminous cylinder and beater, and in this connection the rotation of the cylinder and the beater at different speeds is very advantageous and important.

The rotary brush is a very desirable and useful feature in that it prevents the perforations of the cylinder from becoming clogged and consequently secures a more rapid separation and largely contributes to the increased capacity of the machine for perfect work.

In my improved machine for separating decorticated cotton-seed the beater-shaft is geared to and drives the foraminous cylinder, the rotary brush, and the two conveyers, by which means I am able to produce a machine for the purpose stated which will occupy less space than prior machines of a similar character, while greatly increasing the capacity of the machine for efficient work, so that perfectly clean meal is obtained for immediate use in the rolls and beaters ordinarily employed in a cotton-seed-oil mill.

Having thus described my invention, what I claim is—

A machine for separating decorticated cotton-seed, consisting of a foraminous cylinder and an internal beater and mechanism for rotating said cylinder and beater in the same direction and at different speeds, a vertical hull-conduit leading from the discharge end of the cylinder and provided near its lower end with a slatted aperture, a vibratory riddle discharging at its tail end into said hull-conduit at a point opposite said aperture, and a fan-blower or air-forcing device having an air trunk or pipe extending horizontally under the riddle and provided with a delivery-mouth arranged in juxtaposition to the tail end of said riddle, substantially as described.

In testimony whereof I have hereunto set my hand in presence of two subscribing witnesses.

THOMAS BELL.

Witnesses:
G. W. CLARY,
R. M. WASHINGTON.